United States Patent
Yoneda et al.

(10) Patent No.: US 10,859,766 B2
(45) Date of Patent: Dec. 8, 2020

(54) OPTICAL SEMICONDUCTOR DEVICE

(71) Applicants: Sumitomo Electric Device Innovations, Inc., Yokohama (JP); Sumitomo Electric Industries, Ltd., Osaka (JP)

(72) Inventors: Yoshihiro Yoneda, Yokohama (JP); Takuya Okimoto, Yokohama (JP); Koji Ebihara, Yokohama (JP); Hideki Yagi, Osaka (JP)

(73) Assignees: Sumitomo Electric Device Innovations, Inc., Yokohama (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/548,171

(22) Filed: Aug. 22, 2019

(65) Prior Publication Data
US 2020/0064571 A1 Feb. 27, 2020

(30) Foreign Application Priority Data
Aug. 23, 2018 (JP) ................................. 2018-156173

(51) Int. Cl.
*G02B 6/125* (2006.01)
*G02B 6/293* (2006.01)
(Continued)

(52) U.S. Cl.
CPC ......... *G02B 6/125* (2013.01); *G02B 6/29344* (2013.01); *G02B 6/4215* (2013.01); *H04B 10/613* (2013.01)

(58) Field of Classification Search
None
See application file for complete search history.

(56) References Cited

U.S. PATENT DOCUMENTS

| | | | |
|---|---|---|---|
| 6,501,886 B1 * | 12/2002 | Rankin | G02B 6/125 385/48 |
| 2011/0064360 A1 * | 3/2011 | Jeong | G02B 6/125 385/39 |

(Continued)

FOREIGN PATENT DOCUMENTS

| | | | |
|---|---|---|---|
| DE | 3107112 A1 * | 9/1982 | |
| JP | 5-173030 A * | 7/1993 | |
| WO | 2010/095018 A2 | 8/2010 | |

OTHER PUBLICATIONS

W. Minford et al. Low-loss Ti:LiNbO3 Waveguide Bends at λ=1.3 μm. IEEE Journal of Quantum Electronics, QE-18:10:1802-1806, Oct. 1982. (Year: 1982).*

*Primary Examiner* — Michael Stahl
(74) *Attorney, Agent, or Firm* — Baker Botts L.L.P.; Michael A. Sartori

(57) ABSTRACT

An optical semiconductor device comprises a semiconductor substrate, an optical 90-degree hybrid circuit provided on the substrate, a plurality of input optical waveguides provided on the substrate, and a plurality of output optical waveguides provided on the substrate. The plurality of input optical waveguides is optically coupled to input ends of the optical 90-degree hybrid circuit. The plurality of output optical waveguides is optically coupled to output ends of the optical 90-degree hybrid circuit. Each of the plurality of input optical waveguides includes a first curving portion and a first straight portion adjacent to the first curving portion, and each of the plurality of output optical waveguides includes a second curving portion. A central axis of the first curving portion is inwardly offset with respect to a central axis of the first straight portion, and a central axis of the second curving portion follows a raised sine curve.

17 Claims, 9 Drawing Sheets

(51) Int. Cl.
  *G02B 6/42* (2006.01)
  *H04B 10/61* (2013.01)

(56) References Cited

U.S. PATENT DOCUMENTS

2012/0002921 A1\* 1/2012 Jeong ..................... G02B 6/125
                                                     385/32
2012/0106984 A1\* 5/2012 Jones ..................... H04B 10/60
                                                    398/214
2019/0033526 A1\* 1/2019 Hasegawa ............ G02B 6/2551

\* cited by examiner

US 10,859,766 B2

OPTICAL SEMICONDUCTOR DEVICE

CROSS-REFERENCE TO RELATED APPLICATIONS

This application is based upon and claims the benefit of priority from Japanese Patent Application No. 2018-156173, filed on Aug. 23, 2018, the entire contents of which are incorporated herein by reference.

TECHNICAL FIELD

The present disclosure relates to an optical semiconductor device.

BACKGROUND

WO2010/095018 discloses an optical element and device for optical communication.

SUMMARY

The present disclosure provides an optical semiconductor device. The optical semiconductor device includes a substrate, an optical 90-degree hybrid circuit, a plurality of input optical waveguides, and a plurality of output optical waveguides. The substrate is made of a semiconductor material. The optical 90-degree hybrid circuit is provided on the substrate. The plurality of input optical waveguides is provided on the substrate and is optically coupled to input ends of the optical 90-degree hybrid circuit. The plurality of output optical waveguides is provided on the substrate and is optically coupled to output ends of the optical 90-degree hybrid circuit. Each of the plurality of input optical waveguides includes at least one first curving portion and a first straight portion adjacent to the first curving portion. Each of the plurality of output optical waveguides includes a second curving portion. A central axis of the first curving portion is inwardly offset with respect to a central axis of the first straight portion, and a central axis of the second curving portion follows a raised sine curve.

BRIEF DESCRIPTION OF THE DRAWINGS

The foregoing and other purposes, aspects and advantages will be better understood from the following detailed description of embodiments of the disclosure with reference to the drawings, in which.

DETAILED DESCRIPTION

Figure 1:
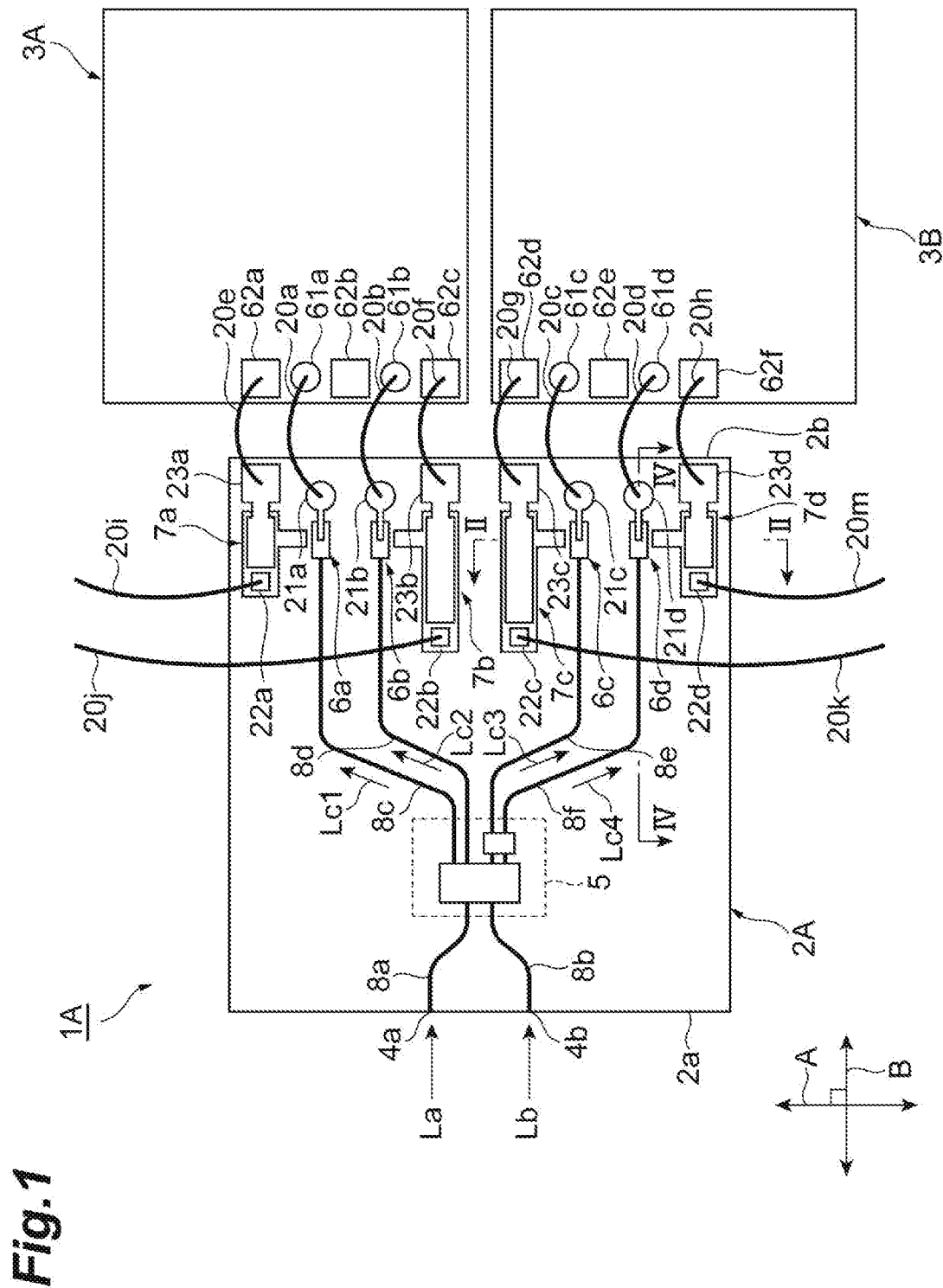
FIG. 1 is a plan view showing a configuration of an optical receiving device with an optical 90-degree hybrid element according to an embodiment.

Problem to be Solved by the Present Disclosure

In a device described in WO 2010/095018, an optical 90-degree hybrid constituted by a multi-mode interferometer (MMI), and waveguide type photodiodes coupled to four output waveguide ends of the optical 90-degree hybrid are monolithically integrated on a common substrate. An optical signal is input from one input optical waveguide and local oscillation light is input from the other input optical waveguide in this device, and the optical signal is converted and divided into four signal components by interference with the optical 90-degree hybrid. The four signal components are converted into electrical signals in the waveguide type photodiode through the corresponding output optical waveguides.

Curved portions of the input optical waveguides and the output optical waveguides require decrease of deviation of a center of intensity distribution of guided light between the curved portions and straight portions adjacent on both sides thereof to reduce loss of the guided light and occurrence of a higher order mode. In the curved portions, the center of the intensity distribution of the guided light is biased outwardly from a central axis of the optical waveguide. In order to make the center of the intensity distribution of the guided light continuous, it is effective to deviate (offset) the central axis of the curved portion slightly inward from a central axis of the straight portions.

A discontinuous point (a step), however, occurs on a side surface of the optical waveguide when a curved portion is offset with respect to a straight portion. If the optical waveguide is of an embedded type, the discontinuous point causes abnormal growth when the optical waveguide is embedded. Further, since the central axis of the curved portion and the central axis of the straight portion adjacent to the curved portion become discontinuous, it is necessary to divide the optical waveguide into a plurality of small sections and to optimize loss by numerical calculation at the time of design. This is a factor which hinders shortening of a design time and a layout creation time.

Effect of the Present Disclosure

According to the present disclosure, it is possible to reduce the light loss, to reduce abnormal growth at the time of embedding, and to reduce the design time and the layout creation time while curbing an influence due to the occurrence of a higher order mode.

DESCRIPTION OF EMBODIMENTS OF THE PRESENT DISCLOSURE

Embodiments of the present disclosure will be enumerated and described. An optical semiconductor device according to one embodiment of the present disclosure includes a substrate, an optical 90-degree hybrid circuit, a plurality of input optical waveguides, and a plurality of output optical waveguides. The substrate is made of a semiconductor material. The optical 90-degree hybrid circuit is provided on the substrate. The plurality of input optical waveguides is provided on the substrate and is optically coupled to input ends of the optical 90-degree hybrid circuit. The plurality of output optical waveguides is provided on the substrate and is optically coupled to output ends of the optical 90-degree hybrid circuit. Each of the plurality of input optical waveguides includes at least one first curving portion and a first straight portion adjacent to the first curving portion. Each of the plurality of output optical waveguides includes a second curving portion. A central axis of the first curving portion is inwardly offset with respect to a central axis of the first straight portion, and a central axis of the second curving portion follows a raised sine curve.

An optical semiconductor device including an optical 90-degree hybrid circuit has a narrow gap between the optical waveguides near the optical 90-degree hybrid circuit, and such gap between the optical waveguides broadens with distance from the optical 90-degree hybrid circuit. This is to facilitate optical coupling or electrical connection to an outside device. Thus, each of the optical waveguides includes a curved portion. In the above-described optical semiconductor device, a shape of the first curved portion and a shape of the second curved portion are different from each other. The central axis of the first curved portion of each of the input optical waveguides is inwardly offset with respect to the central axis of the adjacent straight portion, and thus, a center of an intensity distribution of guided light can be made continuous in the input optical waveguides. Therefore, it is possible to decrease deviation of the center of the intensity distribution of the guided light between the curved portion of the input optical waveguide and straight portions adjacent to both sides thereof and to reduce occurrence of light loss and a higher order mode.

On the other hand, the central axis of the second curved portion of each of the output optical waveguides follows the raised sine curve. The raised sine curve has no discontinuous points in a curvature such as an S-shaped curved waveguide constituted by arcs. Since the central axis of the second curved portion of the output optical waveguide follows the raised sine curve, it is possible to reduce loss of guided light as compared with an S-shaped curved waveguide constituted by arcs. Further, when the central axis of the optical waveguide follows the raised sine curve, no discontinuous points (steps) occur on the side surface of the optical waveguide, unlike when a curved portion is offset with respect to a straight portion. Thus, as compared with the case in which the curved portions of all the optical waveguides including the output optical waveguides are offset with respect to the straight portions, the frequency of occurrence of abnormal growth can be reduced when the optical waveguides are embedded. Furthermore, since the raised sine curve is a continuous function, it can be uniquely determined from positions of a start point and an end point, and an optimization calculation is unnecessary. Therefore, the design time and the layout creation time can be shortened as compared with the case in which the curved portions of all the optical waveguides including the output optical waveguides are offset with respect to the straight portions.

When the curved portion follows the raised sine curve, a higher order mode is more likely to occur as compared with the case in which the curved portion is offset with respect to the straight portions. However, since light propagating through the output optical waveguide is light after interference in the optical 90-degree hybrid circuit, even when a higher order mode occurs and a relative change occurs in the light intensity between signals, an influence thereof is extremely small as compared with the input signal. Thus, even when the central axis of the curved portion of the output optical waveguide is made to follow the raised sine curve, the influence of occurrence of a higher order mode is minor.

As one example, in the above-described optical semiconductor device, at least one first input optical waveguide of the plurality of input optical waveguides may be configured to introduce an optical signal modulated by a method of Quadrature Phase Shift Keying (QPSK) into the optical 90-degree hybrid circuit, and at least one second input optical waveguide of the plurality of input optical waveguides may be configured to introduce local oscillation light to the optical 90-degree hybrid circuit. At least two first output optical waveguides of the plurality of the output optical waveguides may be configured to propagate in-phase components extracted by the optical 90-degree hybrid circuit as differential signals, and at least two second output optical waveguides of the plurality of the output optical waveguides may be configured to propagate quadrature components extracted by the optical 90-degree hybrid circuit as differential signals. A digital coherent transmission method disposes the optical 90-degree hybrid circuit in front of the photodiode. The optical 90-degree hybrid circuit converts and divides the optical signal into four signal components (a positive phase and a negative phase of the in-phase component, and a positive phase and a negative phase of the quadrature component) capable of direct detection by causing the optical signal modulated by the QPSK method and the local oscillation light to interfere with each other. In such a method, it is possible to reduce light loss while curbing the influence of occurrence of a higher order mode using the above-described optical semiconductor device with the optical 90-degree hybrid. Therefore, reception accuracy of the coherently modulated optical signal can be improved (a bit error rate can be reduced).

As one example, the above-described optical semiconductor device may further comprise a dummy optical waveguide extending along an outward side surface of the second curved portion. Accordingly, the dummy optical waveguide and the output optical waveguide constitute an optical directional coupler, and light loss at the curved portion can be further reduced.

As one example, the above-described optical semiconductor device may further include a first dummy optical waveguide extending along an outward side surface of the second curved portion, and a second dummy optical waveguide extending along an inward side surface of the second curved portion. Thus, stabilization of a shape of the optical waveguide (particularly, stabilization of a waveguide curvature) can be achieved when the optical waveguide is formed. Further, the first dummy optical waveguide and the output optical waveguide constitute an optical directional coupler, and light loss at the curved portion can be further reduced.

As one example, the above-described optical semiconductor device may further comprises a plurality of photodiodes provided on the substrate. Each of the plurality of photodiodes is optically connected to a terminal of each of the plurality of output optical waveguides wherein the terminal is located opposite to the optical 90-degree hybrid circuit. Thus, a compact optical 90-degree hybrid element having a photoelectric conversion function can be provided.

Details of the Embodiments of the Present Disclosure

A specific example of the optical semiconductor device with an optical 90-degree hybrid element according to one embodiment of the present disclosure will be described below with reference to the drawings. The present invention is not limited to the exemplifications, will be shown by the claims, and is intended to include all modifications within the scope and meaning equivalent to the claims. In the following description, the same reference numerals are given to the same elements in the description of the drawings, and redundant description thereof will be omitted.

Figure 2:
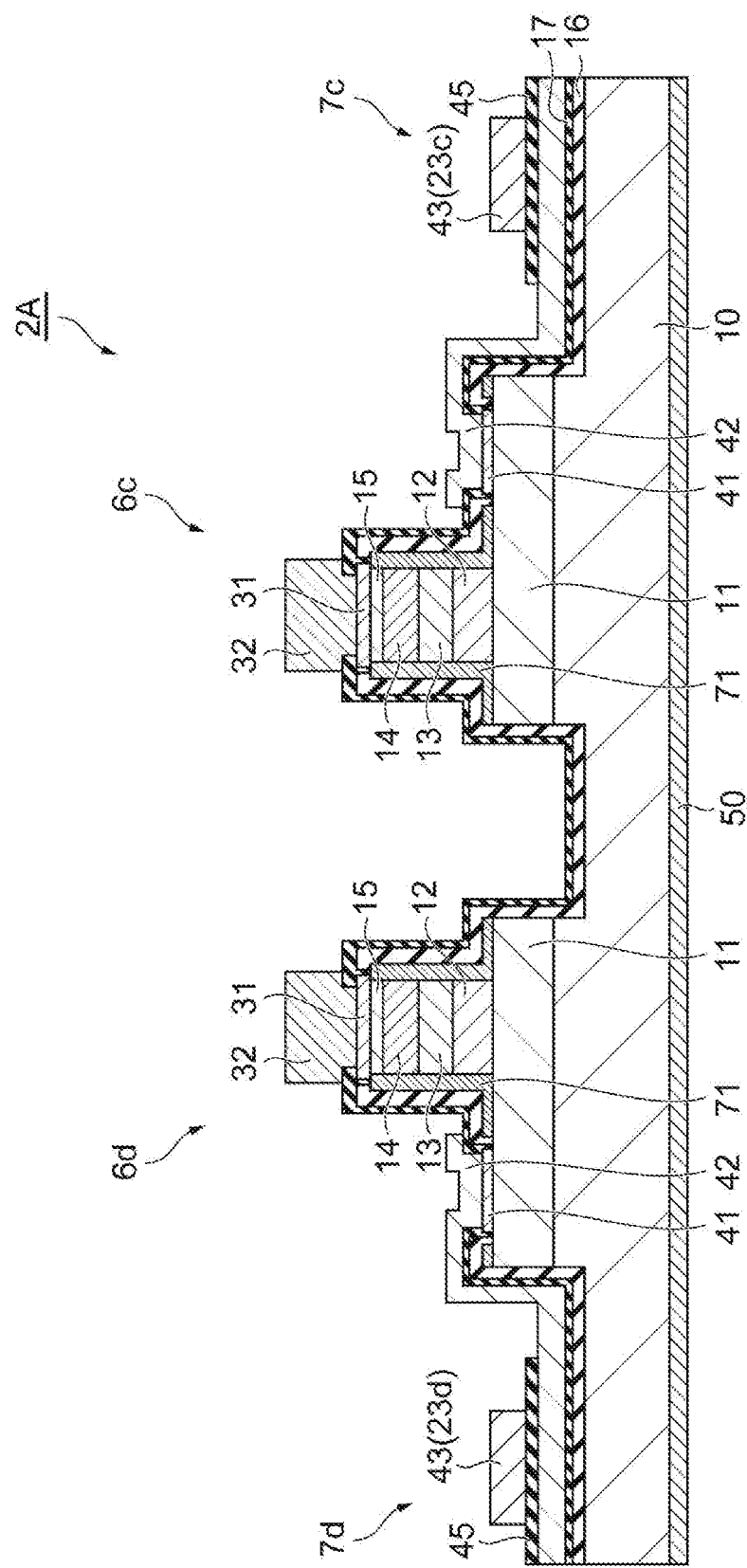
FIG. 2 is a partial cross-sectional view of the optical receiving device shown in FIG. 1, which is taken along line II-II.
Figure 3:
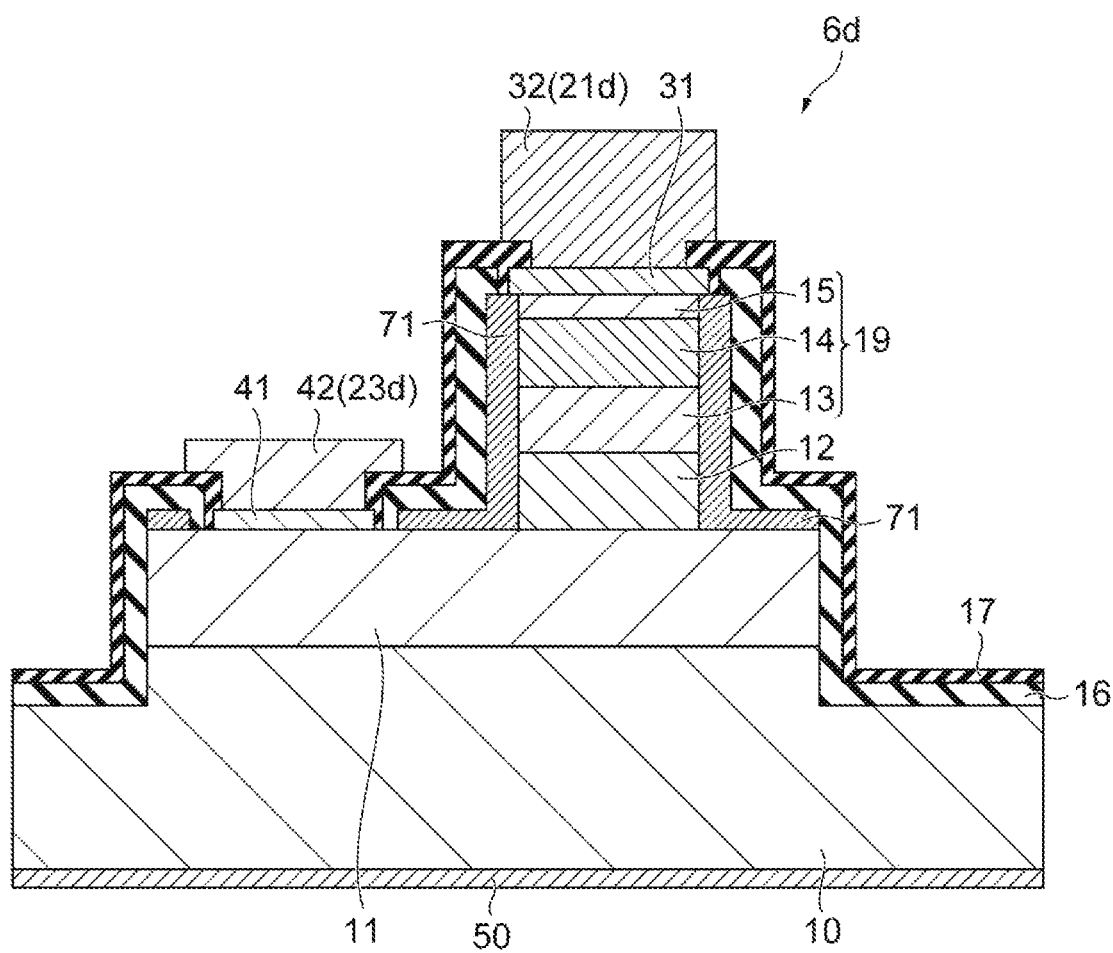
FIG. 3 is an enlarged cross-sectional view showing a part of the cross-sectional view of FIG. 2.
Figure 4:
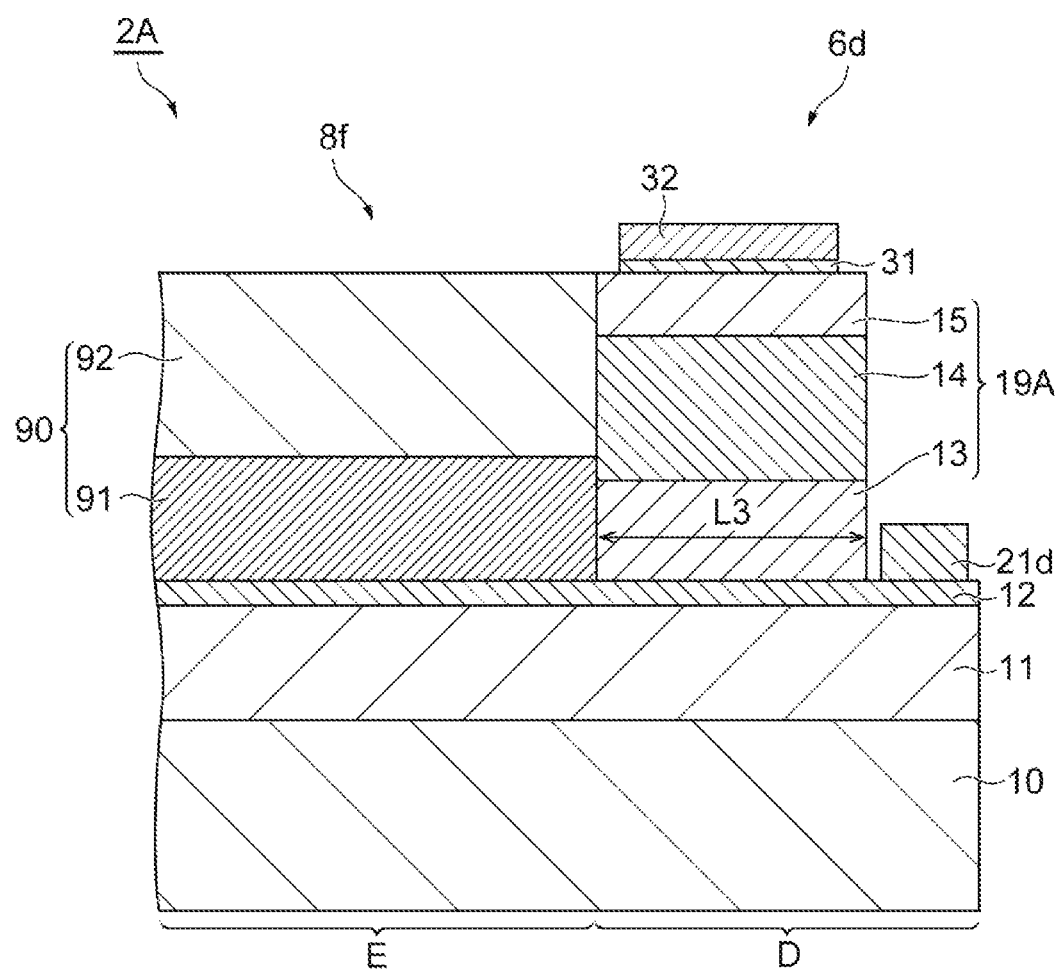
FIG. 4 is a partial cross-sectional view of the optical receiving device shown in FIG. 1 which is taken along line IV-IV.

One embodiment of the present disclosure relates to an optical 90-degree hybrid element in which an optical 90-degree hybrid circuit and waveguide type photodiodes are monolithically integrated, which are mainly used for a coherent optical communication system. FIG. 1 is a plan view showing a configuration of a light receiving device with the optical 90-degree hybrid element according to an embodiment. FIG. 2 shows a cross section of the light receiving device shown in FIG. 1 which is taken along line II-II, and FIG. 3 shows a part of FIG. 2 in an enlarged manner. FIG. 4 shows a cross section of the light receiving device shown in FIG. 1 which is taken along line IV-IV.

As shown in FIG. 1, the light receiving device 1A includes an optical 90-degree hybrid element 2A, and signal amplifiers 3A and 3B. The optical 90-degree hybrid element 2A has a planar shape such as a substantially rectangular shape and is formed by forming optical waveguides on a substrate made of a compound semiconductor material such as InP. The optical 90-degree hybrid element 2A includes two input ports 4a and 4b, an optical 90-degree hybrid circuit 5 provided on the substrate, two input optical waveguides 8a and 8b provided on the substrate, and four output optical waveguides 8c to 8f provided on the substrate. The optical 90-degree hybrid element 2A further includes light receiving elements 6a to 6d and capacitive elements 7a to 7d which are formed on the substrate. That is, the optical 90-degree hybrid element 2A has a structure in which the optical 90-degree hybrid circuit 5 and the light receiving element 6a to 6d are monolithically integrated on a common substrate.

The optical 90-degree hybrid element 2A has a pair of end edges 2a and 2b which extend in a predetermined direction A. The two input ports 4a and 4b are provided at one end edge 2a of the end edges 2a and 2b of the optical 90-degree hybrid element 2A. One input port 4a of the two input ports 4a and 4b is optically coupled to an external optical fiber, and optical signal La including four signal components modulated by the QPSK method is input from outside of the light receiving device 1A through the optical fiber. The optical signal La is wavelength-multiplexed in a wavelength range of 1565 nm to 1612 nm, that is, in an L band of the International Telecommunication Union Telecommunication Standardization Sector (ITU-T). Local oscillation light Lb is input to the other input port 4b. Each of the input ports 4a and 4b is optically coupled to the optical 90-degree hybrid circuit 5 through each of the input optical waveguides 8a and 8b. In other words, one end of the input optical waveguide 8a is coupled to the input port 4a, and the other end of the input optical waveguide 8a opposite to the input port 4a is optically coupled to an input terminal of the optical 90-degree hybrid circuit 5. The input optical waveguide 8a introduces the optical signal La modulated by the QPSK method into the optical 90-degree hybrid circuit 5. One end of the input optical waveguide 8b is coupled to the input port 4b, and the other end of the input optical waveguide 8b opposite to the input port 4b is optically coupled to an input terminal of the optical 90-degree hybrid circuit 5. The input optical waveguide 8b introduces the local oscillation light Lb into the optical 90-degree hybrid circuit 5. The input optical waveguides 8a and 8b are appropriately constituted by a core layer which is formed of a material (for example, InGaAsP) having a relatively large refractive index and a cladding layer which is formed of a material (for example, InP) having a refractive index smaller than that of the core layer and covers the core layer.

The optical 90-degree hybrid circuit 5 is constituted by a multi-mode interference (MMI) coupler and splits the optical signal La into four signal components Lc1 to Lc4 modulated by the QPSK method by causing the optical signal La and the local oscillation light Lb to interfere with each other. Among the four signal components Lc1 to Lc4, the signal components Lc1 and Lc2 are in-phase components, and the signal components Lc3 and Lc4 are quadrature components.

The light receiving elements 6a to 6d have a configuration as PIN photodiodes and are arranged side by side in this order along the end edge 2b of the optical 90-degree hybrid element 2A. Each of the light receiving elements 6a to 6d is optically coupled to the four output ends of the optical 90-degree hybrid circuit 5 through each of the output optical waveguides 8c to 8f. In other words, one end of each of the output optical waveguides 8c and 8d is optically coupled to an output terminal of the optical 90-degree hybrid circuit 5, and the other end of each of the output optical waveguides 8c and 8d opposite to the optical 90-degree hybrid circuit 5 is optically coupled to each of the light receiving elements 6a and 6b. The output optical waveguides 8c and 8d propagate the in-phase components (the signal components Lc1 and Lc2) extracted by the optical 90-degree hybrid circuit 5 as differential signals. One end of each of the output optical waveguides 8e and 8f is optically coupled to an output terminal of the optical 90-degree hybrid circuit 5, and the other end of each of the output optical waveguides 8e and 8f opposite to the optical 90-degree hybrid circuit 5 is optically coupled to each of the light receiving elements 6c and 6d. The output optical waveguides 8e and 8f propagate the quadrature components (the signal components Lc3 and Lc4) extracted by the optical 90-degree hybrid circuit 5 as differential signals.

A constant bias voltage is supplied to cathodes of the light receiving elements 6a to 6d. Each of the light receiving elements 6a to 6d receives each of the four signal components Lc1 to Lc4 from the optical 90-degree hybrid circuit 5 and generates an electrical signal (photocurrent) according to the light intensity of each of the signal components Lc1 to Lc4. Signal output electrode pads 21a to 21d electrically connected to anodes of the light receiving elements 6a to 6d are provided on the optical 90-degree hybrid element 2A. The signal output electrode pads 21a to 21d are provided side by side along the end edge 2b of the optical 90-degree hybrid element 2A in the direction A. The signal output electrode pads 21a to 21d are electrically connected to the signal input electrode pads 61a to 61d of the signal amplifiers 3A and 3B through bonding wires 20a to 20d, respectively.

The capacitive elements 7a to 7d are so-called metal-insulator-metal (MIM) capacitors constituted by a lower metal layer, an upper metal layer, and an insulating film 45 sandwiched between the lower metal layer and the upper metal layer. The lower metal layer and the upper metal layer have a laminated structure such as TiW/Au or Ti/Pt/Au, for example. The capacitive elements 7a to 7d are disposed side by side (adjacent to each other) along the end edge 2b with respect to each of the light receiving elements 6a to 6d on the optical 90-degree hybrid element 2A and are electrically connected between a bias wiring 42 which supplies a bias voltage to the cathode of each of the light receiving elements 6a to 6d and a reference potential wiring (a GND line). The bias wiring 42 is used as a lower metal layer of each of the capacitive elements 7a to 7d. Upper metal layers 43 of the capacitive elements 7a to 7d are drawn to reference potential side electrode pads 23a to 23d disposed along the end edge 2b of the optical 90-degree hybrid element 2A, or become reference potential side electrode pads 23a to 23d. The reference potential side electrode pads 23a to 23d are electrically connected to a back surface metal film 50 provided on a back surface of the substrate 10 through vias (not shown) passing through the substrate 10. The lower metal layers 42 of the capacitive elements 7a to 7d extend toward the inside of the substrate 10. With the capacitive elements 7a to 7d, inductance components between the cathodes of the light receiving elements 6a to 6d and bypass capacitors (not shown) can be designed to be uniform.

The capacitive elements 7a to 7d have bias voltage side electrode pads 22a to 22d connected to lower metal layers 42, respectively. The reference potential side electrode pads 23a to 23d are disposed between the bias voltage side electrode pads 22a to 22d and the end edge 2b of the optical 90-degree hybrid element 2A in a direction B intersecting (for example, orthogonal to) the direction A. One end of each of bonding wires 20i to 20m is connected to each of the bias voltage side electrode pads 22a to 22d. The other end of each of the bonding wires 20i to 20m is electrically connected to a bias voltage source (not shown). Each of the bonding wires 20i to 20m constitutes a part of a wiring for supplying a bias voltage to each of the light receiving elements 6a to 6d. One end of each of bonding wires 20e to 20h is connected to each of the reference potential side electrode pads 23a to 23d. The bonding wires 20e to 20h are provided along the bonding wires 20a to 20d, and the other ends of the bonding wires 20e to 20h are respectively connected to reference potential electrode pads 62a, 62c, 62d and 62f of the signal amplifiers 3A and 3B.

In the embodiment, the capacitive elements 7a to 7d and light receiving elements 6a to 6d are monolithically integrated on substrate 10, and the capacitive elements 7a to 7d are disposed near the light receiving elements 6a to 6d. In addition, one electrode (the upper metal layer 43) of each of capacitive elements 7a to 7d is grounded to the back surface metal film 50 through a via which passes through the substrate 10 and is connected to the reference potential of the signal amplifiers 3A and 3B via the back surface metal film 50. Therefore, the quality of the reference potential of the light receiving elements 6a to 6d can be enhanced.

The signal amplifiers 3A and 3B are amplifiers (trans impedance amplifiers (TIAs)) which amplify the electrical signals (the photocurrents) output from the light receiving elements 6a to 6d. The signal amplifiers 3A and 3B are disposed behind the optical 90-degree hybrid element 2A. The signal amplifier 3A has two signal input electrode pads 61a and 61b, differentially amplifies the electrical signals input to the signal input electrode pads 61a and 61b and generates one voltage signal. The signal amplifier 3B has two signal input electrode pads 61c and 61d, differentially amplifies the electrical signals input to the signal input electrode pads 61c and 61d and generates one voltage signal.

The signal input electrode pads 61a to 61d are disposed side by side in this order along the end edge 2b of the optical 90-degree hybrid element 2A in the direction A. As described above, the signal input electrode pads 61a to 61d are electrically connected to the signal output electrode pads 21a to 21d through the bonding wires 20a to 20d, respectively.

The signal amplifier 3A further includes three reference potential electrode pads 62a, 62b and 62c. The reference potential electrode pads 62a to 62c are disposed side by side in this order along the end edge 2b of the optical 90-degree hybrid element 2A in the direction A. The signal input electrode pad 61a is disposed between the reference potential electrode pads 62a and 62b, and the signal input electrode pad 61b is disposed between the reference potential electrode pads 62b and 62c. Similarly, the signal amplifier 3B further includes three reference potential electrode pads 62d, 62e and 62E The reference potential electrode pads 62d to 62f are disposed side by side in this order along the end edge 2b of the optical 90-degree hybrid element 2A in the direction A. The above-described signal input electrode pad 61c is disposed between the reference potential electrode pads 62d and 62e, and the signal input electrode pad 61d is disposed between the reference potential electrode pads 62e and 62E As described above, the reference potential electrode pads 62a, 62c, 62d and 62f of the signal amplifiers 3A and 3B are electrically connected to the reference potential side electrode pads 23a to 23d through the bonding wires 20e to 20h, respectively.

FIG. 2 shows cross-sectional structures of two light receiving elements 6c and 6d among the four light receiving elements 6a to 6d, and FIG. 3 shows the cross-sectional structure of the light receiving element 6d. The cross-sectional structures of the other light receiving elements 6a and 6b are the same as those of the light receiving elements 6c and 6d. FIG. 4 shows a cross-sectional structure of a junction portion between the light receiving element 6d and the output optical waveguide 8f The respective cross-sectional structures of other junction portions, which includes a junction portion between the light receiving element 6a and the output optical waveguide 8c, a junction portion between the light receiving element 6b and the output optical waveguide 8d, and a junction portion between the light receiving element 6c and the output optical waveguide 8e, are the same as that of the junction portion between the light receiving element 6d and the output optical waveguide 8f As shown in FIG. 4, the light receiving elements 6a to 6d and the output optical waveguides 8c to 8f are integrated on the common substrate 10. The substrate 10 is, for example, a semi-insulating InP substrate.

The cross-sectional structures of the light receiving elements 6a to 6d will be described by taking the light receiving element 6d as an example. As shown in FIG. 3, the light receiving element 6d includes a buffer layer 11 having a high concentration of n-type conductivity provided on the substrate 10, and a waveguide type photodiode structure 19 provided on a region D (refer to FIG. 4) of the n-type buffer layer 11. The waveguide type photodiode structure 19 includes a light absorption layer 13 provided on the n-type buffer layer 11, a cladding layer 14 having a p-type conductivity provided on the light absorption layer 13, and a p-type contact layer 15 provided on the p-type cladding layer 14. Further, the light receiving element 6d has a buffer layer 12 provided between the n-type buffer layer 11 and the light absorption layer 13.

The n-type buffer layer 11 is, for example, a Si-doped InP layer. A Si doping concentration of the n-type buffer layer 11 is, for example, 1×10$^{17}$ cm$^{-3}$ or more. A thickness of the n-type buffer layer 11 is, for example, 1 μm to 2 μm. The buffer layer 12 is a low concentration n-type or i-type semiconductor layer provided between an n-type semiconductor layer (the n-type buffer layer 11 in the present embodiment) of the n-type buffer layer 11 and the p-type cladding layer 14, and the light absorption layer 13. An impurity concentration of the buffer layer 12 is lower than that of the n-type buffer layer 11 or is undoped. In one example, the Si doping concentration of the buffer layer 12 is 1×10$^{16}$ cm$^{-3}$ or less. A band gap of the buffer layer 12 is larger than a band gap of the light absorption layer 13 and equal to or smaller than a band gap of the n-type buffer layer 11. The buffer layer 12 is, for example, a Si-doped InP layer. A thickness of the buffer layer 12 is, for example, 0.1 μm to 0.3 μm.

The light absorption layer 13 mainly includes In$_x$Ga$_{1-x}$As (0<x<1) of which an absorption end has a wavelength of 1612 nm or more (for example, 1650 nm). In other words, the light absorption layer 13 has sensitivity in the L band. The light absorption layer 13 is, for example, an undoped InGaAs layer or a low concentration n-type InGaAs layer having a Si doping concentration of 3×10$^{16}$ cm$^{-3}$ or less. A thickness of the light absorption layer 13 is, for example, 100 nm to 400 nm, and more preferably, for example, 200 nm to 300 nm. The p-type cladding layer 14 is, for example, a Zn-doped InP layer. A Zn doping concentration of the p-type cladding layer 14 is, for example, 2×10$^{17}$ cm$^{-3}$ or more. A thickness of the p-type cladding layer 14 is, for example, 1 μm to 2.5 μm. The p-type contact layer 15 is, for example, a Zn-doped InGaAs layer. A Zn doping concentration of the p-type contact layer 15 is, for example, 1×10$^{18}$ cm$^{-3}$ or more. A thickness of the p-type contact layer 15 is, for example, 100 nm to 300 nm.

A relaxation layer of a hetero energy barrier (ΔEc: conduction band) having an intermediate band gap between the light absorption layer 13 and the buffer layer 12 may be provided between the light absorption layer 13 and the buffer layer 12. The relaxation layer of the hetero energy barrier is undoped or is a low concentration n-type having a Si concentration of 1×10$^{16}$ cm$^{-3}$ or less, and is, for example, an InGaAsP layer having a band gap wavelength of 1.4 μm. Alternatively, a composition graded (tilted) layer which alleviates the hetero energy barrier (ΔEc: conduction band) between the light absorption layer 13 and the buffer layer 12 may be provided between the two layers. The composition graded layer is formed of, for example, two layers of undoped or Si-doped InGaAsP, and the band gap wavelength of each of the two layers is, for example, 1.3 μm and 1.1 μm. The Si concentration is 1×10$^{16}$ cm$^{-3}$ or less. Further, an InGaAsP layer may be provided between the light absorption layer 13 and the p-type cladding layer 14 for the purpose of reducing a travel delay of minority carriers (holes) to realize high-speed response. In addition, a composition graded (tilted) layer which alleviates the hetero energy barrier (ΔEv: valence band) between the light absorption layer 13 and the p-type cladding layer 14 may be provided between the two layers. The composition graded layer is formed of, for example, two layers of undoped or Zn-doped InGaAsP, and the band gap wavelength of each of the two layers is, for example, 1.3 μm and 1.1 μm. The Zn concentration is 1×10$^{17}$ cm$^{-3}$ or less.

The buffer layer 12, the light absorption layer 13, the p-type cladding layer 14, and the p-type contact layer 15 constitutes a mesa structure which extends in a predetermined light guiding direction (the direction B in FIG. 1 in this embodiment). The mesa structure has a pair of side surfaces. The pair of side surfaces of the mesa structure is embedded by an embedding region 71 formed of a semi-insulating material such as Fe-doped InP, for example.

The light receiving element 6d further includes two insulating films 16 and 17. The insulating films 16 and 17 are provided from an upper surface of the mesa structure to an upper surface of the embedding region 71 to cover and protect them. The insulating films 16 and 17 are, for example, insulating silicon compound (SiN, SiON, or SiO$_2$) films. The insulating films 16 and 17 have an opening in the upper surface of the mesa structure, and a p-type ohmic electrode 31 is provided on the p-type contact layer 15 exposed from the insulating films 16 and 17 by the opening. The p-type ohmic electrode 31 is formed of, for example, an alloy of AuZn or Pt and the p-type contact layer 15. Additionally, a wiring 32 is provided on the p-type ohmic electrode 31. The wiring 32 extends in the light guiding direction (the direction B) and electrically connects the p-type ohmic electrode 31 to the signal output electrode pad 21d. The wiring 32 has a laminated structure such as TiW/Au or Ti/Pt/Au, for example, and the signal output electrode pad 21d is formed by Au plating, for example.

The insulating films 16 and 17 also have another opening in the n-type buffer layer 11 apart from the mesa structure of the light receiving element 6d. An n-type ohmic electrode 41 as a cathode is provided on the n-type buffer layer 11 exposed from the insulating films 16 and 17 by the opening. The n-type ohmic electrode 41 is not in contact with the buffer layer 12. The n-type ohmic electrode 41 is formed of, for example, an alloy of AuGe or AuGeNi and the n-type buffer layer 11. Additionally, the bias wiring 42 is provided on the n-type ohmic electrode 41. As shown in FIG. 2, the bias wiring 42 extends to the lower metal layer of the capacitive element 7d and electrically connects the lower metal layer to the n-type ohmic electrode 41.

Subsequently, the cross-sectional structures of the input optical waveguides 8a and 8b and the output optical waveguides 8c to 8f will be described. FIG. 4 includes a structure of a cross section perpendicular to the light guiding direction of the output optical waveguide 8f. The other output optical waveguides 8c to 8e and the input optical waveguides 8a and 8b have the same cross-sectional structures as that of the output optical waveguide 8f. The output optical waveguide 8f includes the n-type buffer layer 11 provided on the substrate 10, and an optical waveguide structure 90 provided on a region E adjacent to the region D of the n-type buffer layer 11. The optical waveguide structure 90 includes a light guiding core layer 91 provided on the n-type buffer layer 11, a cladding layer 92 provided on the light guiding core layer 91, and the buffer layer 12 provided between the n-type buffer layer 11 and the light guiding core layer 91.

The n-type buffer layer 11 is a semiconductor layer which is common to the light receiving element 6d and serves as a first lower cladding layer in the output optical waveguide 8f. The n-type buffer layer 11 is provided from the substrate 10 in the light receiving element 6d to the substrate 10 in the output optical waveguide 8f. The buffer layer 12 is also a semiconductor layer which is common to the light receiving element 6d, and serves as a second lower cladding layer in the output optical waveguide 8f. The buffer layer 12 extends from a space between the n-type buffer layer 11 and the light absorption layer 13 in the light receiving element 6d to the entire space between the n-type buffer layer 11 and the light guiding core layer 91 in the output optical waveguide 8f.

The output optical waveguide 8f and the light receiving element 6d have a butt joint structure, and the light guiding core layer 91 and the light absorption layer 13 are in contact with each other. Thus, the light guiding core layer 91 and the light absorption layer 13 are optically coupled to each other. The light guiding core layer 91 is formed of a material (for example, InGaAsP) which has a refractive index larger than those of the n-type buffer layer 11 and the buffer layer 12 and can be lattice-matched with the buffer layer 11. In one example, a band gap wavelength of InGaAsP of the light guiding core layer 91 is 1.05 μm. A thickness of the light guiding core layer 91 is, for example, 0.3 μm to 0.5 μm. The cladding layer 92 is formed of a material (for example, undoped InP) which has a refractive index smaller than that of the light guiding core layer 91 and can be lattice-matched with the light guiding core layer 91. A thickness of the cladding layer 92 is, for example, 1 μm to 3 μm, and a height of an upper surface of the cladding layer 92 and a height of an upper surface of the p-type contact layer 15 are equal to each other. A part of the n-type buffer layer 11, the buffer layer 12, the light guiding core layer 91, and the cladding layer 92 constitute a mesa structure which extends in a predetermined light guiding direction. Light is confined in the light guiding core layer 91 by the refractive index difference between the buffer layer 11, the buffer layer 12 and the cladding layer 92, and the light guiding core layer 91, and the mesa structure, and the light can be propagated to the light receiving element 6d. A side surface and an upper surface of the mesa structure are protected by being covered with two insulating films 16 and 17 (refer to FIG. 3).

Figure 5:
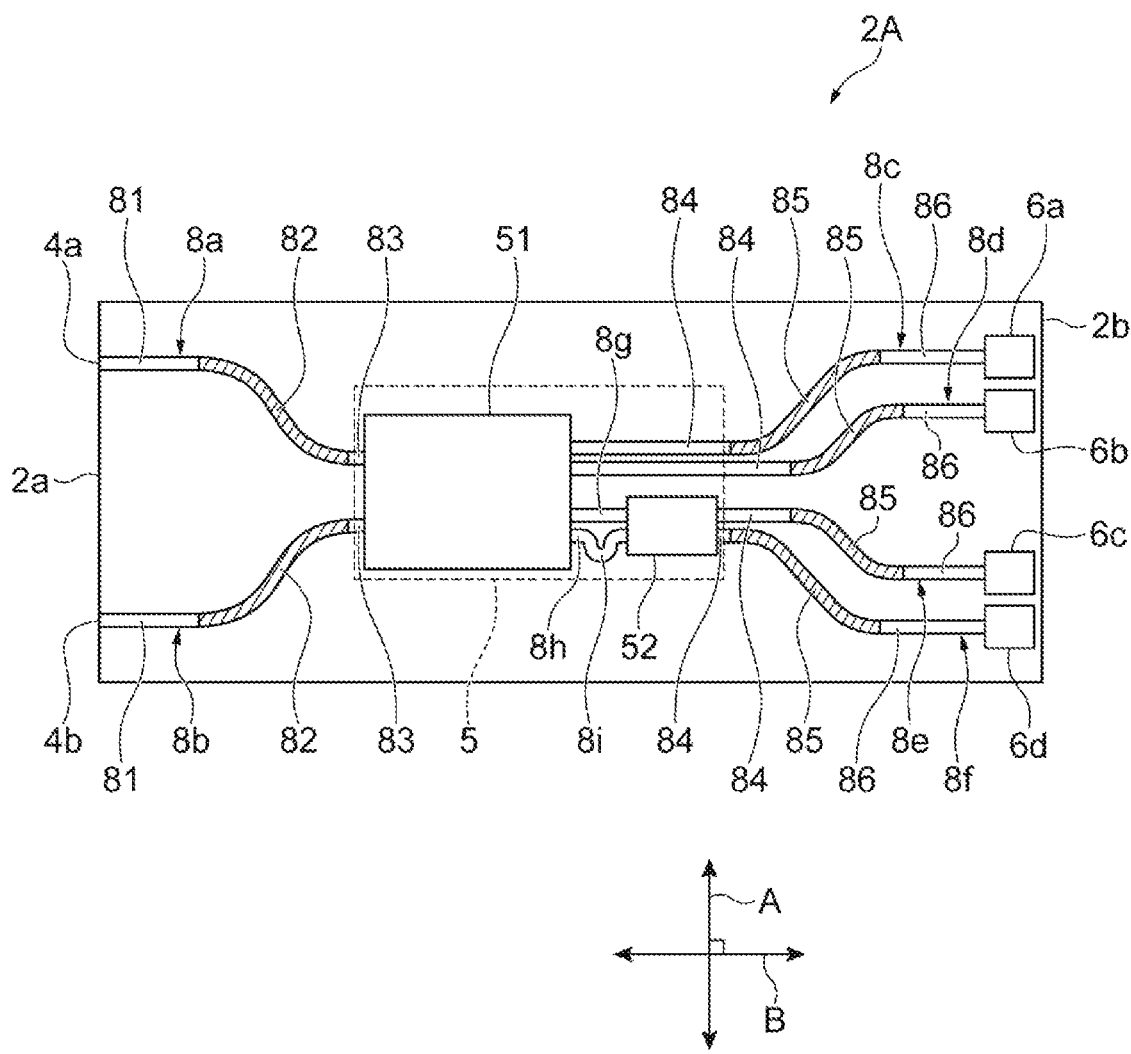
FIG. 5 is a plan view schematically showing the optical 90-degree hybrid element.

FIG. 5 is a plan view schematically showing the optical 90-degree hybrid element 2A. As described above, the optical 90-degree hybrid element 2A includes the input ports 4a and 4b, the optical 90-degree hybrid circuit 5, the input optical waveguides 8a and 8b, the output optical waveguides 8c to 8f, and the light receiving elements 6a to 6d.

The optical 90-degree hybrid circuit 5 includes a two-input and four-output MMI coupler 51 and a two-input and two-output MMI coupler 52. The input optical waveguide 8a is coupled to one input end of the MMI coupler 51, and the input optical waveguide 8b is coupled to the other input end thereof. Two of the four output ends of the MMI coupler 51 are respectively coupled to the two input ends of the MMI coupler 52 via the optical waveguides 8g and 8h. Optical path lengths of the optical waveguides 8g and 8h are different from each other, and in a phase shift part 8i, the optical waveguide 8h is slightly longer than the optical waveguide 8g by the optical waveguide 8h being bent and away from the optical waveguide 8g. Thus, the signal component propagating through the optical waveguide 8h has a delay corresponding to a phase of 45 degrees with respect to the signal component propagating through the optical waveguide 8g. The other two output ends of the MMI coupler 51 are respectively coupled to the output optical waveguides 8c and 8d. The two output ends of the MMI coupler 52 are respectively coupled to the output optical waveguides 8e and 8f.

The input optical waveguides 8a and 8b have planar shapes which are line-symmetrical to each other with respect to the central axis in the direction B. Each of the input optical waveguides 8a and 8b includes a straight portion 81, a curved portion 82 (a hatched portion in the drawing), and a straight portion 83. The straight portions 81 and 83 are portions in which a central axis (an optical axis) of the optical waveguide is linear and which extend in the direction B. The straight portion 81 of the input optical waveguide 8a is connected to the input port 4a, and the straight portion 83 of the input optical waveguide 8a is connected to one input end of the MMI coupler 51. The straight portion 81 of the input optical waveguide 8b is connected to the input port 4b, and the straight portion 83 of the input optical waveguide 8b is connected to the other input end of the MMI coupler 51. A distance between the straight portion 81 of the input optical waveguide 8a and the straight portion 81 of the input optical waveguide 8b is longer than a distance between the straight portion 83 of the input optical waveguide 8a and the straight portion 83 of the input optical waveguide 8b.

Figure 6A:
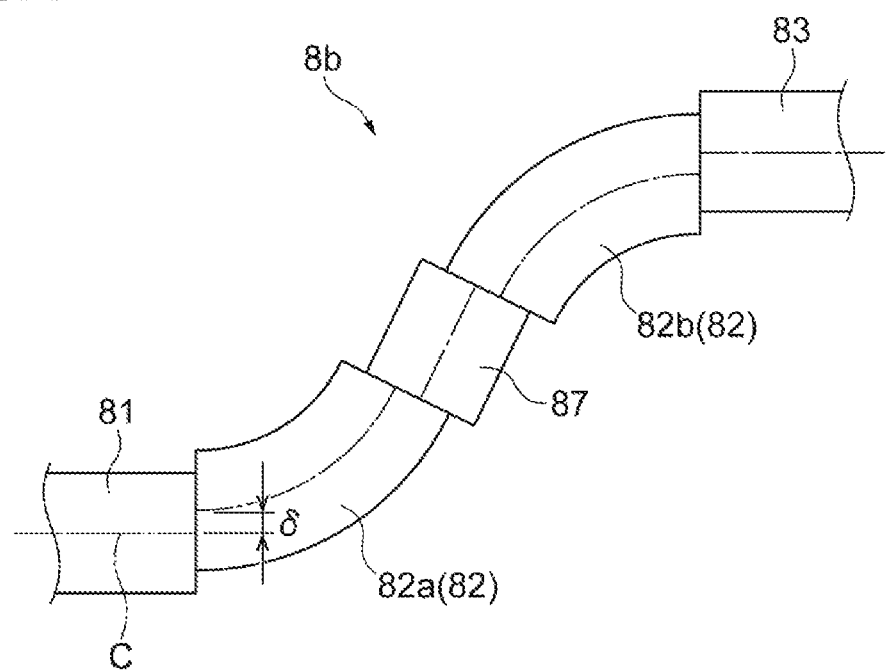
FIG. 6A is an enlarged plan view showing the vicinity of a curved portion of an input optical waveguide.

In each of the input optical waveguides 8a and 8b, the curved portion 82 is provided between the straight portion 81 and the straight portion 83 and connects the straight portions 81 and 83 to each other. FIG. 6A is an enlarged plan view showing the vicinity of the curved portion 82 of the input optical waveguide 8b. The curved portion 82 of the input optical waveguide 8a has a shape obtained by vertically inverting FIG. 6A. The curved portion 82 is an S-shaped curved waveguide and is formed by connecting a curved portion 82a having a center of curvature on one side surface side of the curved portion 82, and a curved portion 82b having a center of curvature on the other side surface side of the curved portion 82 to each other. A straight portion 87 may be provided between the curved portion 82a and the curved portion 82b, and the curved portions 82a and 82b may be connected to each other via the straight portion 87. A central axis C (an optical axis) of each of the curved portions 82a and 82b follows each arc, and a radius of curvature thereof is, for example, within a range of 300 to 500 μm. Further, a central angles of each of the curved portions 82a and 82b is, for example, 45°.

The central axis C of the curved portion 82a is inwardly offset (close to the center of curvature thereof) with respect to the central axis C of each of the adjacent straight portions 81 and 87. Similarly, the central axis C of the curved portion 82b is inwardly offset (closed to the center of curvature thereof) with respect to the central axis C of each of the adjacent straight portions 87 and 83. An offset amount δ is, for example, within a range of 0.04 to 0.1 μm. The radius of curvature can be reduced to contribute to downsizing of the optical 90-degree hybrid element 2A, the increase of the light loss can be curbed, and the occurrence of the high order mode can be curbed by making the curved portions 82 of the input optical waveguides 8a and 8b into such shapes. The curved portion of the optical waveguide in each of the MMI couplers 51 and 52, and the curved portion of the optical waveguide 8h in the phase shift part 8i also have the same planar shape as that in FIG. 6A.

Each of the output optical waveguides 8c to 8f includes a straight portion 84, a curved portion 85 (a hatched portion in the drawing), and a straight portion 86. The straight portions 84 and 86 are portions in which the central axis C (the optical axis) of the optical waveguide is linear and which extend in the direction B. The straight portions 84 of the output optical waveguides 8c and 8d are respectively connected to the two output ends of the MMI coupler 51, and the straight portions 84 of the output optical waveguides 8e and 8f are respectively connected to the two output ends of the MMI coupler 52. The straight portions 86 of the output optical waveguides 8c to 8f are respectively connected to the light receiving elements 6a to 6d. A distance between the straight portion 86 of each of the output optical waveguides 8c and 8d and the straight portion 86 of each of the output optical waveguides 8e and 8f is longer than a distance between the straight portion 84 of each of the output optical waveguides 8c and 8d and the straight portion 84 of each of the output optical waveguides 8e and 8f.

Figure 6B:
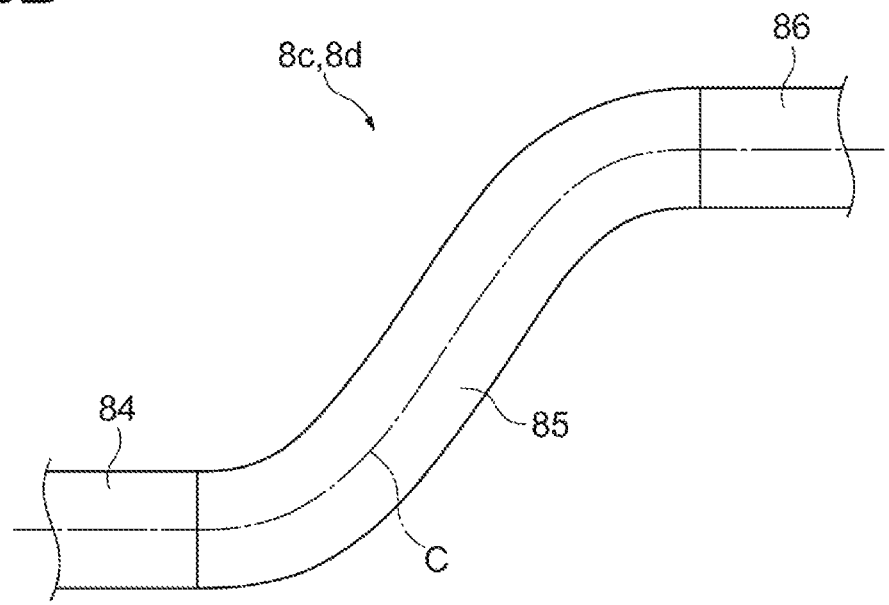
FIG. 6B is an enlarged plan view showing the vicinity of a curved portion of an output optical waveguide.

In each of the output optical waveguides 8c to 8f, the curved portion 85 is provided between the straight portion 84 and the straight portion 86 and connects the straight portions 84 and 86 to each other. FIG. 6B is an enlarged plan view showing the vicinity of the curved portions 85 of the output optical waveguides 8c and 8d. The curved portions 85 of the output optical waveguides 8e and 8f have a shape obtained by vertically inverting FIG. 6B. The curved portion 85 is an S-shaped curved waveguide of which the central axis C follows a raised sine curve. That is, the curved portions 85 of the output optical waveguides 8c to 8f do not have an offset shape like the curved portions 82 of the input optical waveguides 8a and 8b. An average radius of curvature of each of the curved portions 85 is smaller than the radius of curvature of each of the curved portions 82a and 82b of the input optical waveguides 8a and 8b and is, for example, within a range of 100 to 200 µm.

Figure 7:
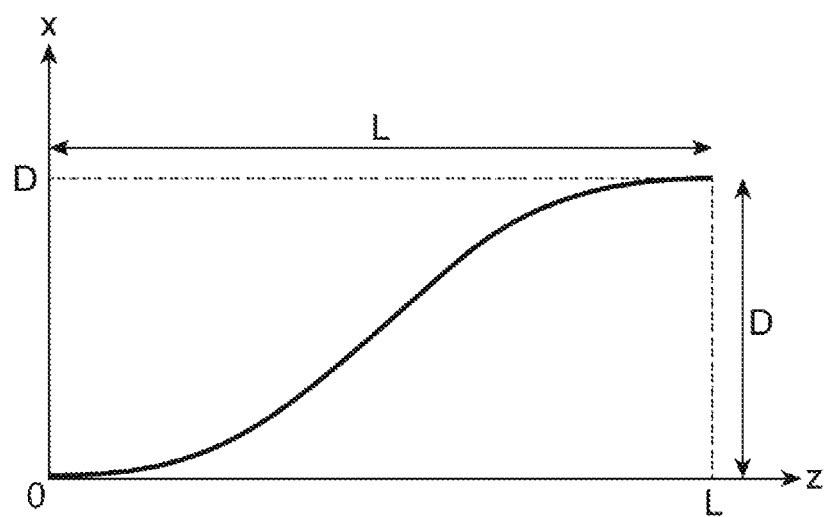
FIG. 7 is a diagram showing a coordinate system (z, x) for describing an S-shaped curved waveguide.

Here, the raised sine curve will be described in detail. FIG. 7 is a diagram showing a coordinate system (z, x) for describing the S-shaped curved waveguide. A z-axis follows the direction B, and an x-axis follows the direction A. Start point coordinates of the S-shaped curved waveguide are (0, 0), and end point coordinates are (L, D). L is a z-direction size of the S-shaped curved waveguide, and D is an x-direction size of the S-shaped curved waveguide.

When the S-shaped curved waveguide is constituted by two arcs, the radius R of curvature of each of the arcs is expressed as R=(L+D)/4D. A function of this curve is expressed by the following Equation using R.

$$x = \begin{cases} R - \sqrt{R^2 - z^2} & \left(0 \le z \le \frac{L}{2}\right) \\ D - R + \sqrt{R^2 - (z-L)^2} & \left(\frac{L}{2} \le z \le L\right) \end{cases} \quad \text{[Math 1]}$$

In the case of an arc, the curvature changes discontinuously at z=0, z=L/2, and z=L. Specifically, the curvature changes from 0 to 1/R at z=0, the curvature changes from 1/R to −1/R at z=L/2, and the curvature changes from −1/R to 0 at z=L. On the other hand, a raised sine curve of which the curvature changes continuously is expressed by the following Equation.

$$x = \frac{D}{2\pi}\left(2\pi\frac{z}{L} - \sin 2\pi\frac{z}{L}\right) \quad \text{[Math 2]}$$

An example of a dimension of the optical 90-degree hybrid element 2A is shown. A basic waveguide width of each of the input optical waveguides 8a and 8b and the output optical waveguides 8c to 8f is, for example, 2.5 µm. A length of the MMI coupler 51 in the direction B is, for example, 335 µm, and a width thereof in the direction A is, for example, 22 µm. A length of the MMI coupler 52 in the direction B is, for example, 178 µm, and a width thereof in the direction A is, for example, 6.7 µm. A length of the optical 90-degree hybrid element 2A in the direction B is, for example, 3.3 mm, and a width thereof in the direction A is, for example, 1.2 mm.

The effects obtained by the optical 90-degree hybrid element 2A according to the above-described embodiment will be described. In the optical 90-degree hybrid element 2A, a gap between the input optical waveguides 8a and 8b and a gap between the output optical waveguides 8c to 8f near the optical 90-degree hybrid circuit 5 are narrow, and the gap between the input optical waveguides 8a and 8b and the gap between the output optical waveguides 8c to 8f become wider as they are away from the optical 90-degree hybrid circuit 5. This is to facilitate the optical coupling between the optical system of the optical signal La and the local oscillation light Lb provided outside of the optical 90-degree hybrid element 2A and the input ports 4a and 4b, and the electrical connection between the signal amplifiers 3A and 3B and the light receiving elements 6a to 6d. Therefore, each of the input optical waveguides 8a and 8b includes the curved portion 82, and each of the output optical waveguides 8c to 8f includes the curved portion 85.

In the optical 90-degree hybrid element 2A, shapes of the curved portions in the input optical waveguides 8a and 8b and shapes of the output optical waveguides 8c to 8f are different from each other. That is, the central axis C of the curved portion 82a of each of the input optical waveguides 8a and 8b is inwardly offset with respect to the central axis C of each of the adjacent straight portions 81 and 87. The central axis C of the curved portion 82b of each of the input optical waveguides 8a and 8b is also inwardly offset with respect to the central axis C of each of the adjacent straight portions 87 and 83. Accordingly, the center of the intensity distribution of the guided light can be made continuous. Therefore, it is possible to curb the deviation of the center of the intensity distribution of the guided light between the curved portions 82a and 82b and the straight portions 81, 87, and 83 adjacent to the both sides thereof and to reduce the light loss and the occurrence of the higher order mode.

As described above, when the curved portion is offset with respect to the straight portion, the discontinuous point (the step) is generated on the side surface of the optical waveguide. In the light receiving elements 6a to 6d and the output optical waveguides 8c to 8f in the vicinity thereof, partially embedded regrowth may be performed from the viewpoint of reducing a dark current in the light receiving elements 6a to 6d and securing reliability (the embedding region 71 in FIGS. 2 and 3). In such a case, the discontinuous point causes abnormal growth when the optical waveguide is embedded. Since the central axis of the curved portion and the central axis of the straight portion adjacent to the curved portion become discontinuous, it is necessary to divide the optical waveguide into a plurality of small sections and to optimize the loss by a numerical calculation at the time of design. This is a factor which hinders shortening of the design time and the layout creation time. Furthermore, an optimum value of the offset amount δ differs according to a wavelength of light. Therefore, when a wavelength range spans a wide band in a wavelength division multiplex (WDM) communication system, the light loss may further increase according to the wavelength.

In the embodiment, the central axis C of the curved portion 85 of each of the output optical waveguides 8c to 8f does not have an offset and has a shape along a raised sine curve. The raised sine curve has no discontinuous points in a curvature such as the S-shaped curved waveguide constituted by arcs. Therefore, since the central axis C of the curved portion 85 of each of the output optical waveguides 8c to 8f follows the raised sine curve, it is possible to reduce the loss of guided light as compared with the S-shaped curved waveguide constituted by arcs. Further, when the central axis C of the optical waveguide follows the raised sine curve, no discontinuous point (step) occurs on the side surface of the optical waveguide, unlike the case in which the curved portion is offset with respect to the straight portion. Thus, the frequency of occurrence of the abnormal growth can be reduced when the optical waveguides are embedded, as compared with the case in which the curved portion is offset with respect to the straight portion in all of the input optical waveguides 8a and 8b and the output optical waveguides 8c to 8f. Since the raised sine curve is a continuous function, it is uniquely determined from the positions of the start point and the end point (refer to FIG. 7), it can be easily calculated only by an elementary function, and the optimization calculation is unnecessary. Thus, the design time and the layout creation time can be shortened, as compared with the case in which the curved portion is offset with respect to the straight portion in all of the input optical waveguides 8a and 8b and the output optical waveguides 8c to 8f. Wavelength dependence of the light loss can be reduced, and even when the wavelength range of the WDM spans a wide band, an increase in the light loss can be curbed regardless of the wavelength, and thus high sensitivity characteristics can be provided.

When the curved portion follows the raised sine curve, the higher order mode is more likely to occur as compared with the case in which the curved portion is offset with respect to the straight portion. Since the signal components Lc1 to Lc4 propagating through the output optical waveguides 8c to 8f are light after the interference in the optical 90-degree hybrid circuit 5, even when the higher order mode occurs and the light intensity of the signal components Lc1 to Lc4 is relatively changed, the influence (the influence on light receiving sensitivity of the light receiving elements 6a to 6d or sensitivity deviation characteristic between channels) thereof is extremely small as compared with the case in which the higher order mode occurs in the optical signal La or the local oscillation light Lb and a relative change occurs in the light intensity. Therefore, even when the central axis C of the curved portion 85 of each of the output optical waveguides 8c to 8f is caused to follow the raised sine curve, the influence of the occurrence of the higher order mode is minor.

Figure 8:
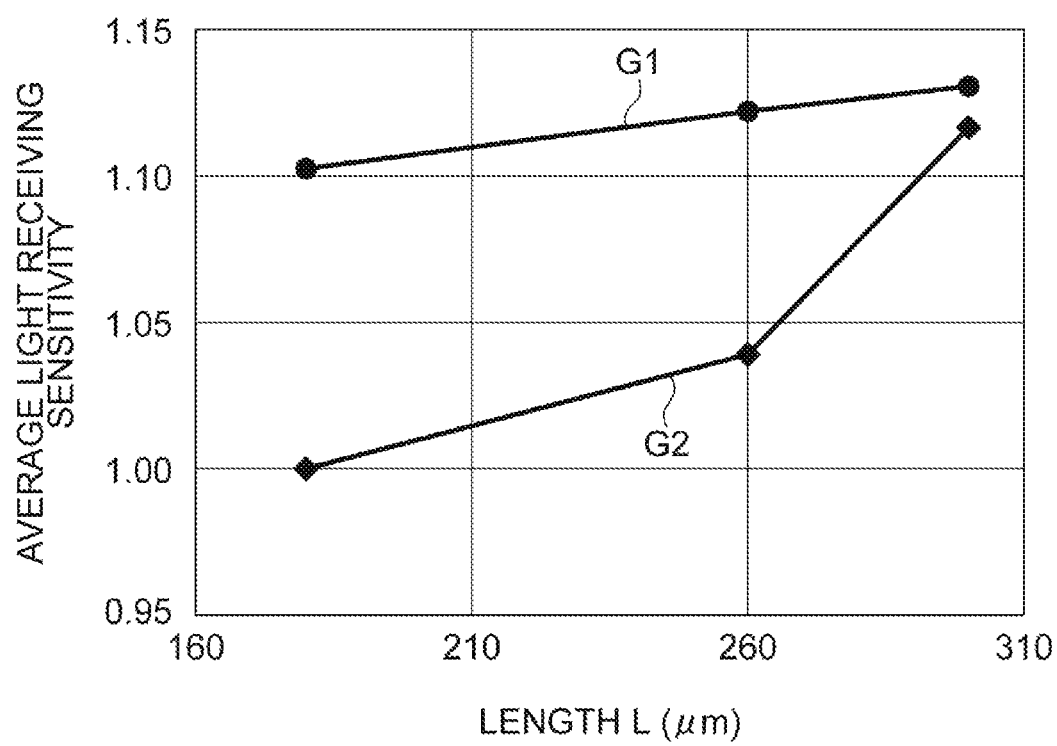
FIG. 8 is a graph showing an example of light receiving sensitivity characteristics of an element in which the S-shaped curved waveguide and a light receiving element are integrated.

FIG. 8 is a graph showing an example of the light receiving sensitivity characteristic of an element in which an S-shaped curved waveguide and a light receiving element are integrated. A graph G2 shows the light receiving sensitivity characteristic in the form (refer to FIG. 6A) in which the offset is provided, and a graph G1 shows the light receiving sensitivity characteristic in the form (refer to FIG. 6B) along the raised sine curve. A horizontal axis represents a length L of the S-shaped curved waveguide in the z-axis direction, and a vertical axis represents an average light receiving sensitivity (a normalized value that a case in which the length L is 180 µm in the form in which the offset is provided is defined as 1) of the four light receiving elements. In this example, three types of elements having lengths L of 180 µm, 260 µm, and 300 µm, respectively, were fabricated and compared. In the form in which the offset is provided, the radius R of curvature of the arc was 100 µm, 170 µm, and 220 µm. The wavelength of light used is 1550 nm.

As is clear from FIG. 8, in all the lengths L, the light receiving sensitivity characteristic in the form along the raised sine curve is higher than the light receiving sensitivity characteristic in the form in which the offset is provided. This tendency is more remarkable as the length L is shorter. For example, when the length L is 180 µm, the light receiving sensitivity in the form along the raised sine curve is about 10% higher than the light receiving sensitivity in the form in which the offset is provided. From this fact, it can be understood that in the present embodiment in which the raised sine curve is adopted in the curved portions 85 of the output optical waveguides 8c to 8f, the light receiving sensitivity characteristic is improved as compared with the case in which the offset is provided in the curved portions of all the optical waveguides.

In addition, since the curved portion 85 of each of the output optical waveguides 8c to 8f has the form along the raised sine curve, even when the average radius of curvature of the curved portion 85 is reduced to 100 to 200 µm, the light loss can be made equal to or less than that of the curved portion 82 of each of the input optical waveguides 8a and 8b. Accordingly, it is possible to miniaturize the optical 90-degree hybrid element 2A (in particular, to miniaturize a dimension in the direction B) while curbing the increase in the light loss. In the embodiment, the length of the optical 90-degree hybrid element 2A in the direction B is 3.3 mm, which is about 60% of that of the conventional optical 90-degree hybrid element. Therefore, the optical 90-degree hybrid element 2A of the embodiment can contribute to, for example, miniaturization and high integration of a coherent receiver used for a large capacity transmission system which exceeds 400 Gb/s.

As in the embodiment, the input optical waveguide 8a may introduce the optical signal La modulated by the QPSK method into the optical 90-degree hybrid circuit 5, the input optical waveguide 8b may introduce the local oscillation light Lb into the optical 90-degree hybrid circuit 5, the output optical waveguides 8c and 8d may propagate the in-phase component extracted by the optical 90-degree hybrid circuit 5 as a differential signal, and the output optical waveguides 8e and 8f may propagate the quadrature component extracted by the optical 90-degree hybrid circuit 5 as a differential signal. It is possible to provide a coherent light receiving device capable of reducing the light loss while curbing the influence due to the occurrence of the higher order mode using the optical 90-degree hybrid element 2A having the above-described configuration in such a method. Therefore, the reception accuracy of the coherently modulated optical signal La can be improved (the bit error rate can be reduced).

The optical 90-degree hybrid element 2A may include the light receiving elements 6a to 6d as waveguide type photodiode structures provided on the substrate 10 common to the optical 90-degree hybrid circuit 5, the input optical waveguides 8a and 8b and the output optical waveguides 8c to 8f. As a result, it is possible to provide a compact optical 90-degree hybrid element 2A having a photoelectric conversion function.

First Modified Example

Figure 9A:
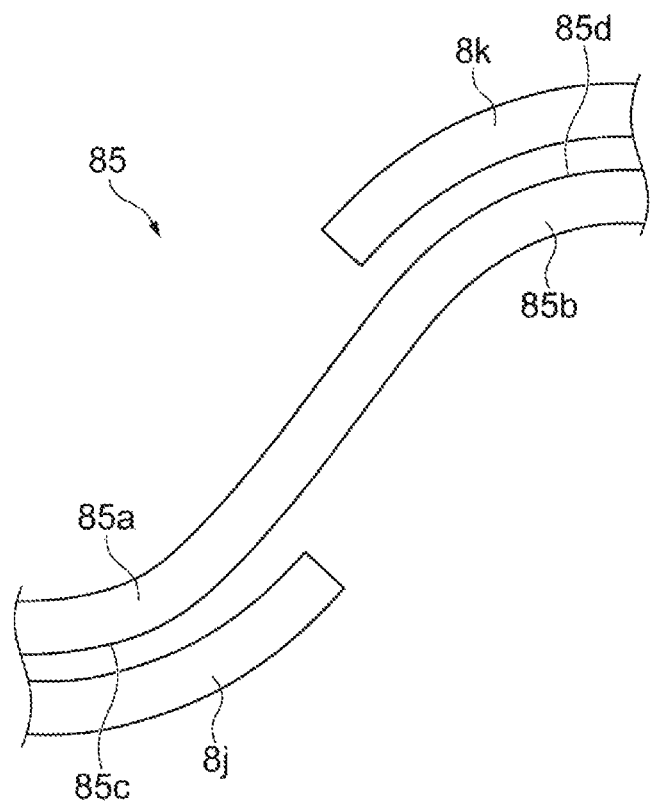
FIG. 9A is an enlarged plan view showing a configuration of the vicinity of a curved portion of an output optical waveguide according to a first modified example.

FIG. 9A is an enlarged plan view showing a configuration in the vicinity of the curved portions 85 of the output optical waveguides 8c to 8f according to a first modified example of the embodiment. In this modified example, dummy optical waveguides 8j and 8k are provided in addition to the configuration of the above-described embodiment. The dummy optical waveguides 8j and 8k extend along the outer surface of the curved portion 85 and do not contribute to the light guiding. Specifically, the dummy optical waveguide 8j is provided to face an outer surface 85c of the curved portion 85a having a center of curvature on one side of the curved portion 85, which is located opposite to the center of curvature thereof. A gap between an inner surface of the dummy optical waveguide 8j and the outer surface 85c of the curved portion 85a is constant (for example, 0.5 µm or less). The dummy optical waveguide 8k is provided to face an outer surface 85d of the curved portion 85b having a center of curvature on the other side of the curved portion 85, which is located opposite to the center of curvature thereof. That is, the dummy optical waveguides 8j and 8k are located on the opposite sides of the curved portion 85. A gap between the inner surface of the dummy optical waveguide 8k and the outer surface 85d of the curved portion 85b is constant (for example, 0.5 µm or less). The cross-sectional structures of the dummy optical waveguides 8j and 8k are the same as those of the output optical waveguides 8c to 8f (refer to FIG. 4).

In the modified example, the dummy optical waveguides 8j and 8k and the curved portions 85a and 85b are disposed close to each other and constitute an optical directional coupler. It is possible to further reduce the light loss in the curved portions 85a and 85b by providing such dummy optical waveguides 8j and 8k with respect to the curved portions 85a and 85b in which the centers of intensity of the guided light are eccentric.

Second Modified Example

Figure 9B:
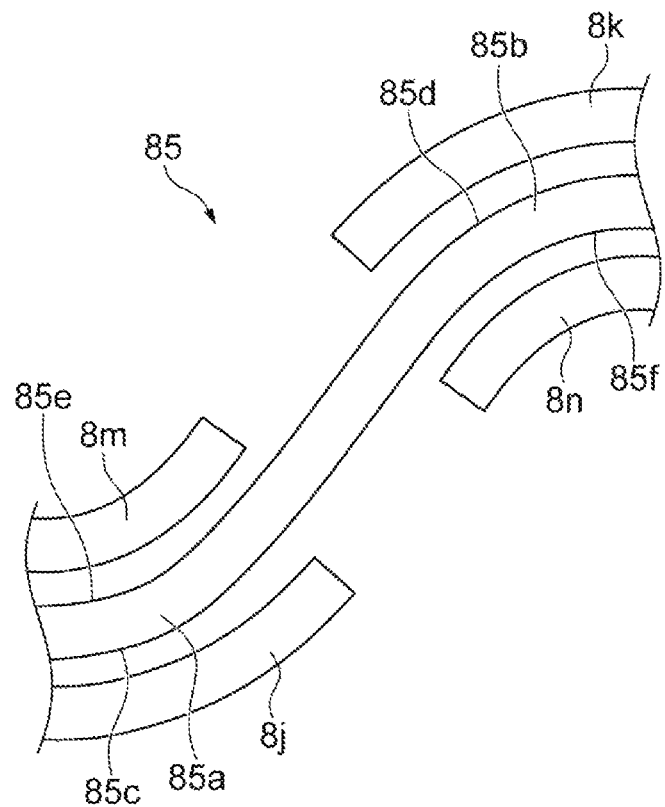
FIG. 9B is an enlarged plan view showing a configuration of the vicinity of a curved portion of an output optical waveguide according to a second modified example.

FIG. 9B is an enlarged plan view showing a configuration in the vicinity of the curved portion 85 of the output optical waveguides 8c to 8f according to a second modified example of the embodiment. Dummy optical waveguides 8m and 8n are further provided in addition to the configuration shown in FIG. 9A. In this modified example, the dummy optical waveguides 8j and 8k are first dummy optical waveguides, and the dummy optical waveguides 8m and 8n are second dummy optical waveguides. The detailed configuration of the dummy optical waveguides 8j and 8k is the same as that in the first modified example. However, a gap between the inner surfaces of the dummy optical waveguides 8j and 8k and the outer surfaces 85c and 85d of the curved portions 85a and 85b may be wider than that in the first modified example.

The dummy optical waveguides 8m and 8n extend along the inner surface of the curved portion 85 and do not contribute to the light guiding. Specifically, the dummy optical waveguide 8m is provided to face an inner surface 85e of the curved portion 85a having a center of curvature on one side of the curved portion 85, which is located on the side of the center of curvature thereof. That is, the dummy optical waveguide 8m faces the dummy optical waveguide 8j with the curved portion 85a interposed therebetween. A gap between an outer surface of the dummy optical waveguide 8m and the inner surface 85e of the curved portion 85a is constant. Further, the dummy optical waveguide 8n is provided to face an inner surface 85f of the curved portion 85b having a center of curvature on the other side of the curved portion 85, which is located on the side of the center of curvature thereof. That is, the dummy optical waveguide 8n is located on the opposite side of the curved portion 85 with respect to the dummy optical waveguide 8m and faces the dummy optical waveguide 8k with the curved portion 85b interposed therebetween. A gap between an outer surface of the dummy optical waveguide 8n and the inner surface 85f of the curved portion 85b is constant (for example, 0.5 µm or less). The cross-sectional structures of the dummy optical waveguides 8m and 8n are the same as those of the output optical waveguides 8c to 8f (refer to FIG. 4).

A curved waveguide with a raised sine curve shape has a large maximum value of a curvature thereof as compared with an S-shaped curved waveguide formed by an acc. According to the modified example, it is possible to stabilize a shape of the optical waveguide (in particular, to stabilize a waveguide curvature) when the curved portions 85a and 85b are formed. When the dummy optical waveguides 8j and 8k and the curved portions 85a and 85b constitute an optical directional coupler, the light loss in the curved portions 85a and 85b can be further reduced as in the first modified example.

As described above, although the disclosure was concretely explained on the basis of the embodiment, the present invention is not limited to the above-described embodiment and can be changed in the range which does not deviate from the gist. For example, in the above-described embodiment, although the optical 90-degree hybrid element 2A including two input optical waveguides 8a and 8b and four output optical waveguides 8c to 8f has been exemplified, the number of input optical waveguides and output optical waveguides is not limited thereto. The disclosure can be applied to the light 90° hybrid element including M (M is an integer of 2 or more) input optical waveguides optically coupled to the input ends of the optical 90-degree hybrid circuit 5 and N (N is an integer of 2 or more) output optical waveguides optically coupled to the output ends of the optical 90-degree hybrid circuit 5. In that case, at least one input optical waveguide among the M input optical waveguides may introduce the optical signal La modulated by the QPSK method into the optical 90-degree hybrid circuit 5, and at least one other input optical waveguide among the M input optical waveguides may introduce the local oscillation light Lb into the optical 90-degree hybrid circuit 5. Further, at least two output optical waveguides among the N output optical waveguides may propagate the in-phase component extracted by the optical 90-degree hybrid circuit as a differential signal, and at least two other output optical waveguides among the N output optical waveguides may propagate the quadrature component extracted by the optical 90-degree hybrid circuit as a differential signal.

The composition of the light guiding core layer 91 of the above-described embodiment is not limited to the InGaAsP-based material and may be, for example, an AlGaInAs-based material. In the above-described embodiment, although the configuration in which the optical waveguides 8a to 8f and the light receiving elements 6a to 6d are integrated on the common substrate 10 has been exemplified, the optical waveguides 8a to 8f and the light receiving elements 6a to 6d may be provided on separate substrates, respectively, or photoelectric conversion circuits including other InP based electronic devices (for example, hetero junction bipolar transistors), capacitors and resistors may be further integrated on the substrate 10. In the above-described embodiment, the buffer layer 11 is provided on the substrate 10, but when the substrate is an n-type semiconductor substrate, the buffer layer 11 may be omitted. In addition, the conductivity type of each of the semiconductor layers may be opposite to that in the above-described embodiment.

What is claimed is:

1. An optical semiconductor device comprising:
   a substrate made of a semiconductor material;
   an optical 90-degree hybrid circuit provided on the substrate;
   a plurality of input optical waveguides provided on the substrate, the plurality of input optical waveguides being optically coupled to input ends of the optical 90-degree hybrid circuit; and
   a plurality of output optical waveguides provided on the substrate, the plurality of output optical waveguides being optically coupled to output ends of the optical 90-degree hybrid circuit,
   wherein each of the plurality of input optical waveguides includes at least one first curved portion and a first straight portion adjacent to the first curved portion, and each of the plurality of output optical waveguides includes a second curved portion and a second straight portion adjacent to the second curved portion, wherein a central axis of the first curved portion is inwardly offset with respect to a central axis of the first straight portion, and a central axis of the second curved portion follows a raised sine curve, that is not inwardly offset with respect to a central axis of the second straight portion.

2. The optical semiconductor device according to claim 1, wherein at least one first input optical waveguide of the plurality of input optical waveguides is configured to introduce an optical signal modulated by a method of Quadrature Phase Shift Keying (QPSK) into the optical 90-degree hybrid circuit, and at least one second input optical waveguide of the plurality of input optical waveguides is configured to introduce local oscillation light to the optical 90-degree hybrid circuit.

3. The optical semiconductor device according to claim 2, wherein at least two first output optical waveguides of the plurality of the output optical waveguides are configured to propagate in-phase components extracted by the optical 90-degree hybrid circuit as differential signals, and at least two second output optical waveguides of the plurality of the output optical waveguides are configured to propagate quadrature components extracted by the optical 90-degree hybrid circuit as differential signals.

4. The optical semiconductor device according to claim 1, further comprising a dummy optical waveguide extending along an outer surface of the second curved portion.

5. The optical semiconductor device according to claim 1, further comprising:
   a first dummy optical waveguide extending along an outer surface of the second curved portion; and
   a second dummy optical waveguide extending along an inner surface of the second curved portion.

6. The optical semiconductor device according to claim 1, further comprising a plurality of photodiodes provided on the substrate, each of the plurality of photodiodes being optically connected to a terminal of each of the plurality of output optical waveguides wherein the terminal is located opposite to the optical 90-degree hybrid circuit.

7. The optical semiconductor device according to claim 1, wherein the each of the plurality of input optical waveguides further includes a third straight portion adjacent to the first curved portion at the opposite side of the first straight portion, the third straight portion being coupled to one of the input ends of the optical 90-degree hybrid circuit.

8. The optical semiconductor device according to claim 7, wherein a distance between the first straight portions disposed adjacently each other is longer than a distance between the third straight portions disposed adjacently each other.

9. The optical semiconductor device according to claim 7, wherein the first curved portion is provided between the first straight portion and the third straight portion, and connects the first straight portion to the third straight portion.

10. The optical semiconductor device according to claim 7, wherein each of the plurality of input optical waveguides includes two first curved portions of the at least one first curved portion and a middle straight portion disposed between the two first curved portions, one of the two first curved portions being connected to the first straight portion and the other of the two first curved portions being connected to the third straight portion.

11. The optical semiconductor device according to claim 1, wherein each of the plurality of output optical waveguides includes a fourth straight portion adjacent to the second curved portion at the opposite side of the second straight portion, the second straight portion being coupled to one of the output ends of the optical 90-degree hybrid circuit.

12. The optical semiconductor device according to claim 11, wherein a distance between the fourth straight portions disposed adjacently each other is longer than a distance between the second straight portions disposed adjacently each other.

13. The optical semiconductor device according to claim 11, wherein the second curved portion is provided between the second straight portion and the fourth straight portion, and connects the second straight portion to the fourth straight portion.

14. The optical semiconductor device according to claim 1, wherein an average radius of curvature of the second curved portion is smaller than the radius of curvature of the first curved portion.

15. The optical semiconductor device according to claim 1, wherein a radius of curvature of the first curved portion is within a range of 300 µm to 500 µm.

16. The optical semiconductor device according to claim 1, wherein an average radius of curvature of the second curved portion is within a range of 100 µm to 200 µm.

17. The optical semiconductor device according to claim 1, wherein an offset amount of the central axis of the first curved portion with respect to the central axis of the first straight portion is within a range of 0.04 µm to 0.1 µm.

* * * * *